(12) United States Patent
Gottlieb

(10) Patent No.: US 9,438,724 B2
(45) Date of Patent: *Sep. 6, 2016

(54) NOTIFICATION AND TROUBLESHOOTING OF INTERRUPTIONS, FAILURES, AND UPDATES

(71) Applicant: Broadcom Corporation, Irvine, CA (US)

(72) Inventor: Jay Evan Gottlieb, Newport Beach, CA (US)

(73) Assignee: BROADCOM CORPORATION, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/713,326

(22) Filed: May 15, 2015

(65) Prior Publication Data

US 2015/0249738 A1 Sep. 3, 2015

Related U.S. Application Data

(63) Continuation of application No. 14/041,428, filed on Sep. 30, 2013, now Pat. No. 9,060,056.

(60) Provisional application No. 61/876,920, filed on Sep. 12, 2013.

(51) Int. Cl.
| | |
|---|---|
| H04M 1/24 | (2006.01) |
| H04M 3/08 | (2006.01) |
| H04M 3/22 | (2006.01) |
| H04M 3/24 | (2006.01) |
| H04M 3/10 | (2006.01) |
| H04M 11/06 | (2006.01) |

(52) U.S. Cl.
CPC ............. *H04M 3/24* (2013.01); *H04M 3/2209* (2013.01); *H04M 3/10* (2013.01); *H04M 11/062* (2013.01)

(58) Field of Classification Search
CPC .... H04M 1/24; H04M 3/306; H04M 3/2209; H04M 3/30; H04M 3/308; H04M 3/2227; H04M 3/34; H04M 3/08; H04M 3/10
USPC ................ 379/1.01, 15.01, 15.03, 21, 29.11, 379/32.01, 201.12, 207.06, 207.07
See application file for complete search history.

(56) References Cited

U.S. PATENT DOCUMENTS

| | | | |
|---|---|---|---|
| 7,587,028 B1 | 9/2009 | Broerman et al. | |
| 9,060,056 B2 * | 6/2015 | Gottlieb | H04M 3/24 |
| 2002/0080930 A1 | 6/2002 | Cho | |
| 2005/0094789 A1 | 5/2005 | Lazarus | |
| 2007/0071178 A1 | 3/2007 | Ozaki | |
| 2008/0112329 A1 | 5/2008 | Byers et al. | |

* cited by examiner

*Primary Examiner* — Quoc D Tran
(74) *Attorney, Agent, or Firm* — Foley & Lardner LLP

(57) ABSTRACT

Aspects of notification and troubleshooting of interruptions, failures, and updates are described. In one embodiment, a customer premises equipment (CPE) device determines a status of the CPE device, which may include a status of connectivity with a service provider. When the status indicates an error, a type of the error may be identified and a message selected for audible playback by the CPE device. The CPE device may further ring a telephonic device, to alert a user and playback the message to the user. The message may indicate that a connectivity error exists and, in some cases, assist the user to troubleshoot the error. In other aspects, the CPE device may receive an update from the service provider and ring the telephonic device, to advise the user of upgraded functions or features, for example, or provide a promotional message.

20 Claims, 5 Drawing Sheets

NOTIFICATION AND TROUBLESHOOTING OF INTERRUPTIONS, FAILURES, AND UPDATES

CROSS-REFERENCE TO RELATED APPLICATIONS

This application is a continuation of U.S. application Ser. No. 14/041,428, entitled "NOTIFICATION AND TROUBLESHOOTING OF INTERRUPTIONS, FAILURES, AND UPDATES," filed Sep. 30, 2013, which claims the benefit of and priority to U.S. Provisional Application No. 61/876,920, entitled "NOTIFICATION AND TROUBLESHOOTING OF INTERRUPTIONS, FAILURES, AND UPDATES," filed Sep. 12, 2013, both of which are hereby incorporated by reference herein in their entireties.

BACKGROUND

For some services, such as television, telephone, internet, home monitoring, etc., certain equipment is installed at a customer's premises. The equipment may include a computing device, such as a cable or satellite set-top box, a digital video recorder, a digital subscriber line ("DSL"), cable, or fiber optic cable modem, a router, a broadband gateway, a wireless network access point, a voice over internet protocol ("VoIP") client, or a combination thereof, for example, among other devices. Depending upon the circumstances, the equipment may be installed at the customer's premises, such as a home or office, by the customer or by a service technician of the service provider.

Over time, the customer may experience difficulties with the equipment. For example, the service or function provided by the equipment may only work intermittently over time, based on a variable communications or connectivity status between the equipment and the service provider, for example. In this case, the customer may need to contact the service provider for assistance with troubleshooting the problem.

In some cases, the equipment may identify a connectivity problem, and indicate the problem to the customer via one or more indicators, such as a flashing or blinking light. Such an indicator, while providing some limited feedback to the customer, is generally not adequate to assist the customer with troubleshooting the problem. Further, a flashing or blinking indicator might go unnoticed by the customer for some period of time. With regard to correcting the problem, an inconspicuous indicator may not be suitable to quickly identify and address the problem, which may possibly lead to the customer's frustration.

BRIEF DESCRIPTION OF THE DRAWINGS

For a more complete understanding of the embodiments and the advantages thereof, reference is now made to the following description, in conjunction with the accompanying figures briefly described as follows.

Figure 1:
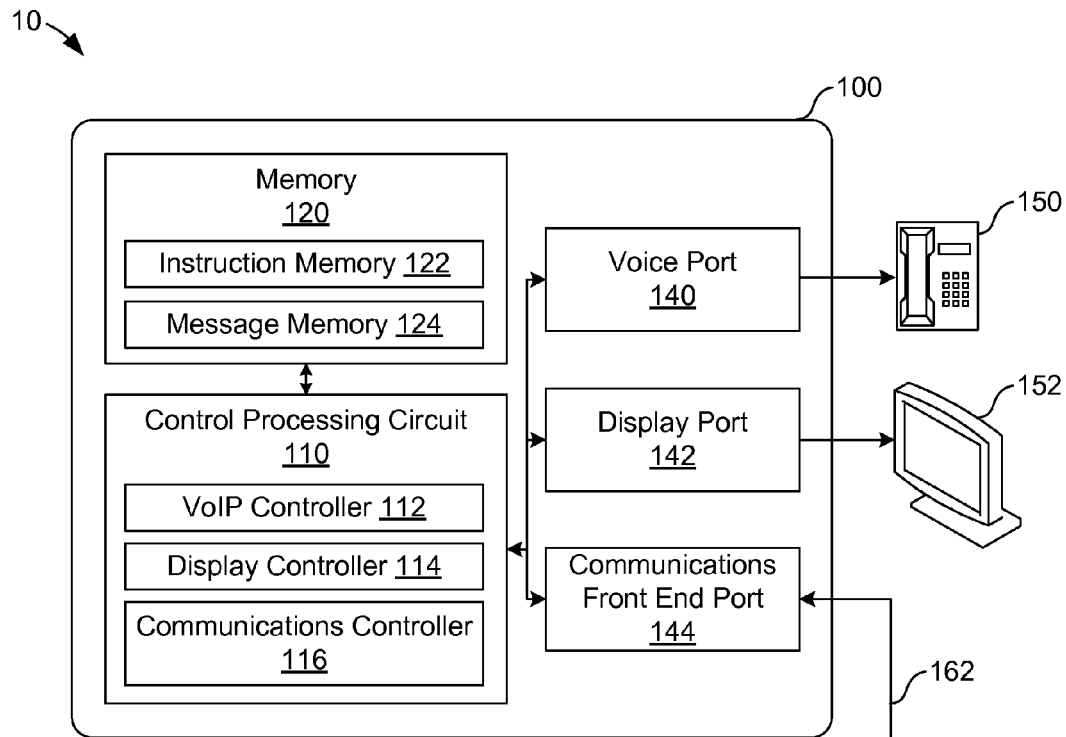
FIG. 1 illustrates a system for notification and troubleshooting of interruptions, failures, and updates according to an example embodiment.
Figure 1:
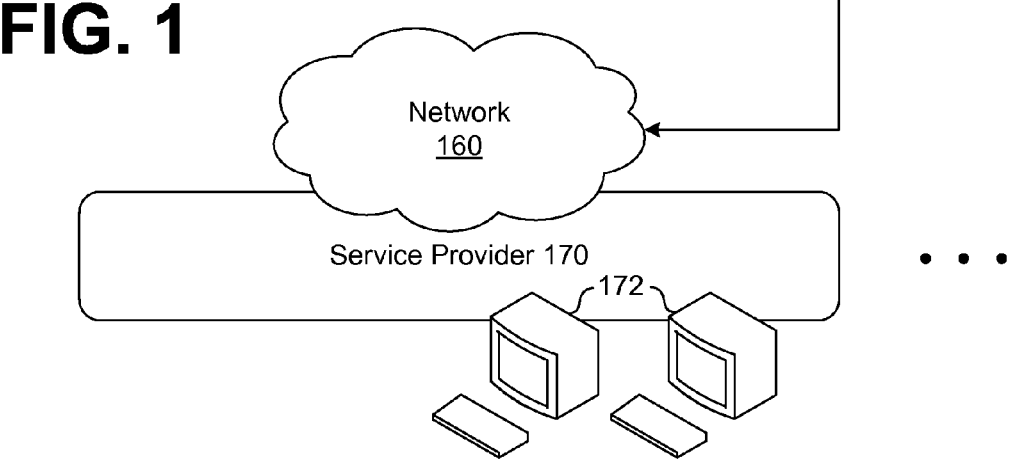

The drawings illustrate only example embodiments and are therefore not to be considered limiting of the scope described herein, as other equally effective embodiments are within the scope and spirit of this disclosure. The elements and features shown in the drawings are not necessarily drawn to scale, emphasis instead being placed upon clearly illustrating the principles of the embodiments. Additionally, certain dimensions or positions of elements and features may be exaggerated to help visually convey certain principles. In the drawings, similar reference numerals between figures designate like or corresponding, but not necessarily the same, elements.

DETAILED DESCRIPTION

In the following paragraphs, the embodiments are described in further detail by way of example with reference to the attached drawings. In the description, well known components, methods, and/or processing techniques are omitted or briefly described so as not to obscure the embodiments.

For some services, such as television, telephone, internet, home monitoring, etc., one or more customer premises equipment ("CPE") devices may be installed at a customer's premises. The CPE device or devices may include a computing device, such as a cable or satellite set-top box, a digital video recorder, a DSL, cable, or fiber optic cable modem, a router, a broadband gateway, a wireless network access point, a VoIP client, or a combination thereof, for example, among other devices. Depending upon the circumstances, the equipment may be installed at the customer's premises, such as a home or office, by the customer or by a service technician of the service provider.

Over time, the customer may experience difficulties with a CPE device. In other words, the ability of the CPE device to perform its service or function may vary over time, based on the communications or connectivity status, for example, between the CPE device and the service provider. For example, due to network problems between the service provider and the CPE device, the CPE device may fail to provide network data access or fail to receive, decode, and/or display one or more television channels. Similarly, the CPE device may fail to provide VoIP telephony services, if a connection to the service provider is interrupted. In addition to network status connectivity problems, the CPE device may experience one or more hardware-related failures, such as a failure of one or more memories, processors, power supplies, physical layer ("PHY") interfaces, etc.

In the case of a network connectivity, hardware, or other failure or error, the customer may need to contact the service provider for assistance with troubleshooting the problem. Sometimes, if the problem is a network related problem, for example, a service representative of the service provider may not be able to assist the customer. Instead, the representative may only be able to advise the customer that the problem has been identified by the service provider and that service technicians are attending to the problem. If the network related problem impacts a significant number of customers, a call center of the service provider may expect to receive a relatively large number of calls, overloading service representatives of the service provider, leading to increased wait times, and resulting in customer frustration due to delay. Further, a customer's frustration may only be increased if, after waiting for a significant period of time to speak to a service representative, the representative only suggests that the customer wait for service technicians to address the problem.

In some cases, a CPE device may identify a connectivity problem, and indicate the problem to a customer via one or more indicators, such as a flashing or blinking light. Such an indicator, while providing some limited feedback to the customer, is generally not adequate to assist the customer with troubleshooting the problem. Further, for CPE devices that are able to diagnose various networking connectivity, hardware-related, and other error conditions, a limited number of indicators may not be sufficient to identify and distinguish among the various types of errors which may be diagnosed.

In the context outlined above, aspects of notification and troubleshooting of interruptions, failures, and updates are described. In one embodiment, a customer premises equipment (CPE) device determines a status of the CPE device, which may include a status of connectivity with a service provider. When the status indicates an error in connectivity, a type of the error may be identified and a message selected for playback by the CPE device for audible playback. Further, the CPE device may cause a telephonic device to ring, to alert a user and playback the message to the user. According to various aspects, the message may indicate to the user that a connectivity error exists and, in some cases, assist the user to troubleshoot the error. In other aspects, the CPE device may receive an update from the service provider and cause the telephonic device to ring, to advise the user of upgraded functions or features, for example, or provide a promotional message.

Turning now to the drawings, a description of exemplary embodiments of a system and its components are provided, followed by a discussion of the operation of the same.

FIG. 1 illustrates a system 10 for notification and troubleshooting of interruptions, failures, and updates according to an example embodiment. The system 10 includes a CPE device 100, a network 160, and a service provider 170. The CPE device 100 includes a control processing circuit 110, a memory 120, a voice port 140, a display port 142, and a communications front end port 144. As illustrated in FIG. 1, the voice port 140 of the CPE device 100 is electrically and communicatively coupled to a telephonic device 150, and the display port 142 of the CPE device 100 is electrically and communicatively coupled to a display device 152. Further, the communications front end port 144 of the CPE device 100 is electrically and communicatively coupled to the network 160 via the communications channel 162. Among embodiments and in general, the network 160 may be embodied as a local or wide area enterprise-level network and incorporate, at least in part, portions of or connections to the Internet and/or other networks such as plain old telephone service ("POTS") networks.

At the outset, it is noted that the elements of the CPE device 100 in FIG. 1 are provided by way of example only. In additional embodiments, the CPE device 100 may include other elements or omit one or more of the elements illustrated in FIG. 1. For example, the CPE device 100 may additionally include an 802.11-based (i.e., "WiFi") communications subsystem, and the CPE device 100 may operate as a wireless access point. Additionally or alternatively, the CPE device 100 may include other subsystems, such as sensor, alarm, network switch, network router, or firewall subsystems, for example, among others. As generally described herein, the CPE device 100 may diagnose the status of any system, subsystem, or element in the CPE device 100, among embodiments, and the aspects of notification and troubleshooting described herein may be relied upon in connection with any of the system or subsystem elements of the CPE device 100, without limitation.

The control processing circuit 110 includes, among other elements, one or more processing circuits configured to coordinate operations of the CPE device 100. As such, the control processing circuit 110 may be embodied as an application specific integrated circuit ("ASIC"), a general purpose processing circuit configured by the execution of computer-readable instructions, other specific- or general-purpose circuitry and/or logic elements, or any combination thereof, for example. The control processing circuit 110 may be additionally or alternatively embodied according to one or more elements of the computing environment described below with reference to FIG. 4.

In the example embodiment illustrated in FIG. 1, the control processing circuit 110 includes VoIP, display, and communications controllers 112, 114, and 116, respectively, which operate in connection with the voice port 140, the display port 142, and the communications front end port 144. The VoIP controller 112 may interface with the voice port 140 to provide VoIP services. That is, the VoIP controller 112 may connect telephone calls using internet protocols and data packets, according to any known VoIP techniques and/or protocols suitable for the application. It should be appreciated that, using VoIP services, telephone calls originating from POTS networks and data protocol networks may be received by the CPE device 100, in the form of data packets, via the communications channel 162. When receiving a call, the VoIP controller 112 causes the telephony device 150 to ring, to alert a user of an inbound call. The CPE device 100 is similarly able to place outbound calls.

According to certain aspects of the CPE device 100 described below, the VoIP controller 112 and/or the voice port 140 include, among other circuit elements, digital-to-analog ("DAC") and analog-to-digital ("ADC") converter elements, as understood in the art, for converting data samples into analog signals and analog signals into data samples. In this manner, a user of the CPE device 100 can conduct telephone calls, routed via the network 160, with other individuals using the telephonic device 150. In addition to relying on the telephonic device 150 to place standard telephone calls, the CPE device 100 is also configured to playback various messages over the telephonic device. The messages may be played back from the memory 120 of the CPE device 100. Alternatively or additionally, before being played back, the messages may be received by the CPE device 100 from the service provider 170 via the communications channel 162. In this manner, a user of the CPE device 100 may be advised of the status, status conditions, updates, and other information associated with the CPE device 100, as further discussed below. In this sense, the playback of a message does not rely upon the receipt of an inbound call, as in the case of the receipt of a standard telephone call. Instead, the CPE device 100 is configured to cause the telephonic device 150 to ring in certain circumstances, to provide information to a user of the CPE device 100, depending upon the status of the CPE device 100, as described herein. Further aspects of the operation of the VoIP controller 112 and the playback of messages to a user of the CPE device 100 are described below.

The display controller 114 may transmit signals for display on the display device 152. The signals may include both video and audio components, for example, for display and/or reproduction by the display device 152. According to certain aspects of the embodiments described herein, if a user of the CPE device 100 does not answer a call placed to the telephonic device 150 within a certain predetermined period of time, the display controller 114 may overlay a voice message indicator over a display output of the CPE device 100. Further aspects of the operation of the display controller 114 are described below.

The communications controller 116 is configured to coordinate, supervise, and diagnose the operations of the communications front end port 144 and/or the communications channel 162. In this regard, the communications controller 116 may perform a diagnostic analysis. In some embodiments, the diagnostic analysis may include a spectrum analysis on the communications channel 162 between the CPE device 100 and the network 160 and/or the service provider 170. Further aspects of the operation of the communications controller 116 are described below.

The voice port 140, the display port 142, and the communications front end port 144 each includes a physical layer ("PHY") connection of the CPE device 100. In particular, the voice port 140 includes a physical layer connection for coupling the CPE device 100 to the telephonic device 150, the display port 142 includes a physical layer connection for coupling the CPE device 100 to the display device 152, and the communications front end port 144 includes a physical layer connection for coupling the CPE device 100 to the communications channel 162. In one embodiment, the voice port 140 may include a telephone jack (e.g., RJ11 modular connector), among other physical structural elements, for coupling the CPE device 100 to the telephonic device 150. Further, the display port 142 may include a high definition multimedia interface ("HDMI") port, for example, among other physical structural elements, for coupling the CPE device 100 to the display device 152, although other video and/or audio connectors are within the scope and spirit of the embodiments described herein. The communications front end port 144 may include a coaxial cable jack, Ethernet jack (e.g., RJ45 modular connector), or optical cable interconnect jack, for example, among other types of connectors, for coupling the CPE device 100 to the communications channel 162, depending upon the medium of the communications channel 162. It is noted that the CPE device 100 may include additional physical layer ports or jacks, among embodiments, such as universal serial bus ("USB"), infra-red ("IR"), digital interconnect format ("DIF"), or other ports or jacks.

Each of the physical layer ports 140, 142, and 144 may include one or more optical and/or electrical receivers, transmitters, amplifiers, mixers, duplexers, and filter circuits, for example, to support digital and/or analog communications using one or more suitable communications standards or protocols. Further, in certain aspects and embodiments, processing circuits of the physical layer ports 140, 142, and 144 may execute computer-readable application and/or driver instructions stored in memory. The instructions may be executed, for example, to support certain operations or functions of the physical layer ports 140, 142, and 144. In other embodiments, the operations or functions of the physical layer ports 140, 142, and 144 may be embodied in one or more embedded, specific-purpose, and/or ASIC circuits, or combinations thereof. In this context, it should be appreciated that each of the physical layer ports 140, 142, and 144 may operate among various abstraction layers in the Open Systems Interconnection ("OSI") model, for example.

The telephonic and display devices 150 and 152 in FIG. 1 are representative and provided by way of example only, and it should be appreciated that other devices may be coupled to the CPE device 100 in the system 10. Generally, the telephonic device 150 may be embodied as any suitable and well known telephone, such as a wired or wireless telephone, with one or more handsets. Using the telephonic device 150, a user of the CPE device 100 can be advised of one or more operating status conditions of the CPE device 100, as described herein. The display device 152 may be embodied as any suitable display device, such as a television or computer monitor, with or without speakers for audio playback.

The memory 120 includes, at least, a computer-readable instruction memory area 122 and a message storage memory area 124. The computer-readable instruction memory area 122, generally, stores instructions for execution by the control processing circuit 110 and other elements of the CPE device 100. The message storage memory area 124 stores one or more messages for playback to a user of the CPE device 100 over the telephonic device 150, based on various circumstances described herein. Among other messages, the messages stored in the message storage memory area 124 may include installation or connectivity troubleshooting messages, messages indicating that new features of the CPE device 100 have been enabled or installed, and promotional or informative messages. The messages may include one or more segments, and the CPE device 100 may playback one or more segments of the message over the telephonic device 150, in turn, as responses (e.g., touchtone responses) are received from the user. Certain messages may be stored in the message storage memory area 124 before the CPE device 100 is installed, and other messages may be updated and/or stored in the message storage memory area 124 over time based on data received by the CPE device 100 from the service provider 170 via the communications channel 162.

Among other operational aspects described below in connection with FIGS. 2A-2C, the CPE device 100 is configured to determine and/or diagnose various aspects of its operating status. Additionally or alternatively, the CPE device 100 is configured to determine and/or diagnose a status of connectivity with the service provider 170 via the communications channel 162 and/or the network 160. The determination of the status of the CPE device 100 may include a determination as to whether the CPE device 100 is being powered on for the first time, whether a telephonic device is coupled to the voice port 140 of the CPE device 100, whether updates (e.g., software updates) are available for download, whether one or more errors or failure conditions have been encountered, etc.

The determination of the status of connectivity between the CPE device 100 and the service provider 170 may be based on a diagnostic analysis. The diagnostic analysis may be performed by the communications controller 116 and/or the communications front end port 144 on the communications channel 162. In this context, the communications controller 116 and/or the communications front end port 144 may perform a spectrum analysis, for example, on the communications channel 162. The spectrum analysis may be performed periodically, from time-to-time, or as directed by a user, for example. Among other aspects of diagnostics, the spectrum analysis may identify a power density of one or more communications channels across a frequency band over time.

Based on the diagnostic analysis, the control processing circuit 110 of the CPE device 100 may select a message from the message memory 124 for audible playback over the telephonic device 150. For example, the CPE device 100 may select a message which indicates that the channel power density is insufficient to decode and display one or more television channels or that data communications, VoIP telecommunications, or other features or services are unavailable due to network problems. Thus, when the status of connectivity indicates an error or other condition, the CPE device 100 may identify a type of the error and select a message for audible playback based on the type of the error. Other than connectivity error messages, the CPE device 100 may also select among messages which indicate a hardware failure, a software update, or an available promotion, for example, as further described below. After selecting the message, the CPE device 100 may cause the telephonic device 150 to ring, in an attempt to capture the attention of a user of the CPE device 100. While causing the telephonic device 150 to ring, the CPE device 100 may monitor for an off-hook status of the telephonic device 150, and play the message over the telephonic device 150 after detecting the off-hook status.

In other aspects, one or more of the messages stored in the message memory area 124 (and/or received from the service provider 170) may include an installation troubleshooting message or a connectivity troubleshooting message, either of which may include a plurality of message segments. In this context, the CPE device 100 may play a first segment of such a message over the telephonic device 150 and wait a predetermined period of time (e.g., 5, 10, 20, 30 seconds) for a response from the telephonic device 150 corresponding to the first segment. If no response is received, then the CPE device 100 may attempt to ring the telephonic device 150 another time and/or display an overlay a voice message indicator to the display device 152 via the display port 142.

On the other hand, if a response corresponding to the first segment is received from the telephonic device 150, then the CPE device 100 may perform a further diagnostic or directed procedure, for example, based on the response. After the diagnostic or directed procedure, the CPE device 100 may select a second segment of the connectivity troubleshooting message for audible playback based on an outcome of the diagnostic procedure, and play the second segment over the telephonic device 150.

According to the features outlined above (and further described below), the CPE device 100 proactively notifies users when various events, such as connectivity errors, hardware failures, software updates, and promotional events occur. In contrast to the flashing or blinking indicators described above, causing the telephonic device 150 to ring may be more likely to grasp the attention of a user of the CPE device 100. Further, several different types of message for playback may be stored in the memory 120. Thus, the CPE device 100 may select among various messages to provide to users, based upon the circumstances. In part, the proactive nature of the notifications provided by the CPE device 100, according to the embodiments described herein, may avert the need for users to contact the service provider 170 with questions. For example, a message provided by the CPE device 100 may state: "Channels X and Y are currently unavailable, due to poor signal quality. Service Provider has been informed of this condition, and is currently addressing the problem. Thank you for your patience. We will contact you as soon as the issue has been resolved." It is also noted that, in this way, the need for service representatives may be reduced.

Figure 2A:
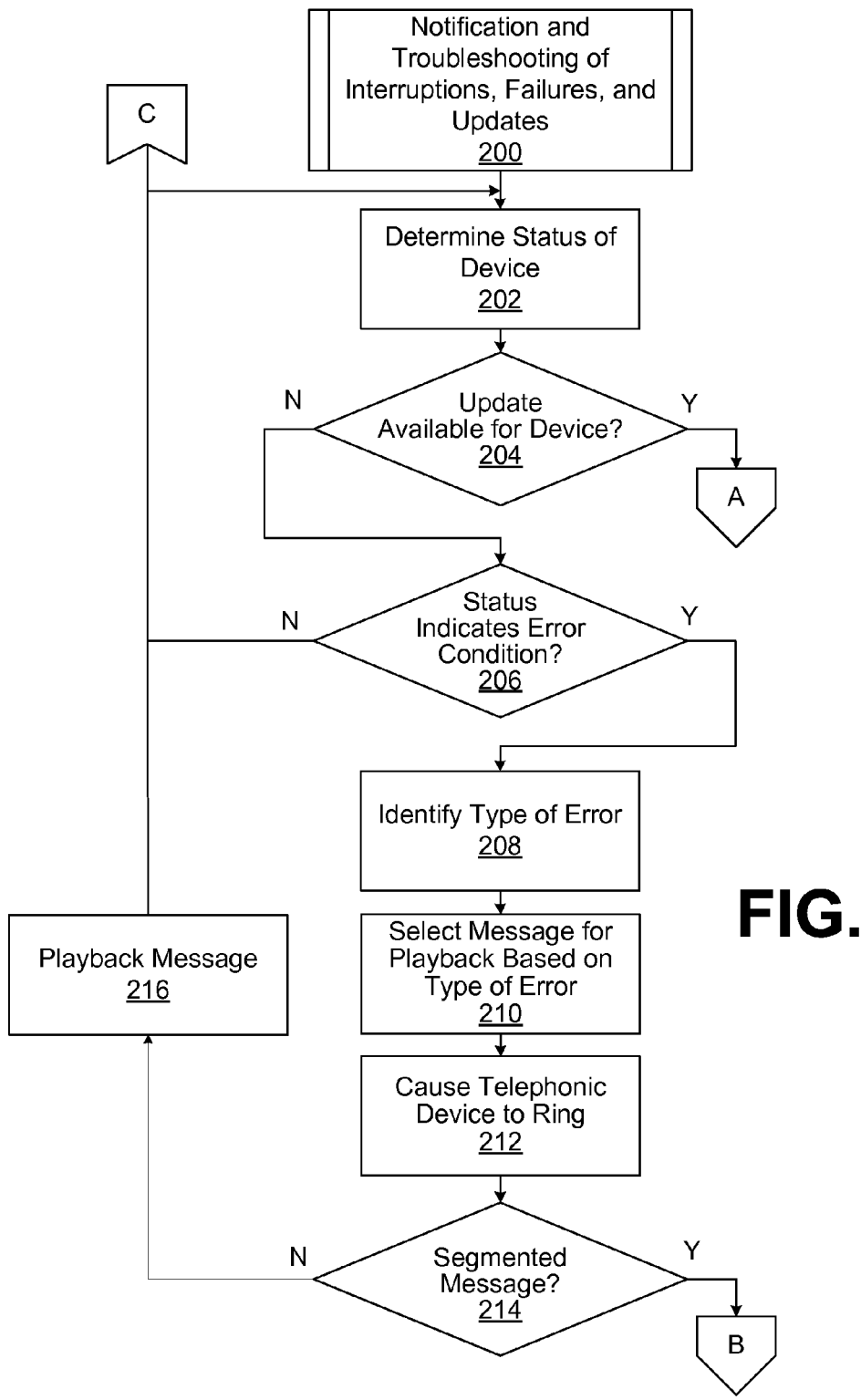
FIG. 2A illustrates a flow diagram for a process of notification and troubleshooting of interruptions, failures, and updates performed by the system of FIG. 1 according to an example embodiment.
Figure 2B:
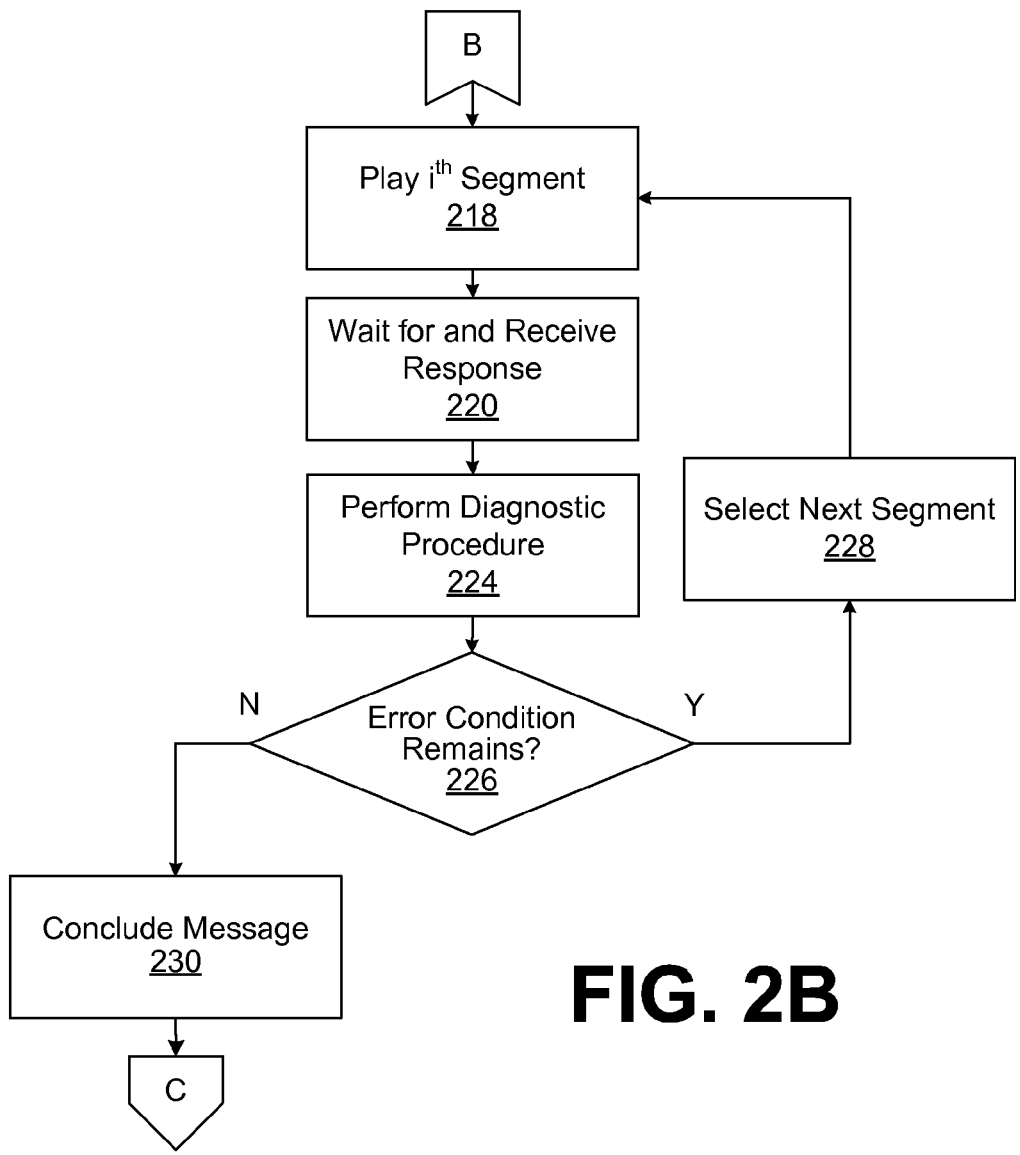
FIG. 2B further illustrates the flow diagram for the process of notification and troubleshooting performed by the system of FIG. 1 according to an example embodiment.
Figure 2C:
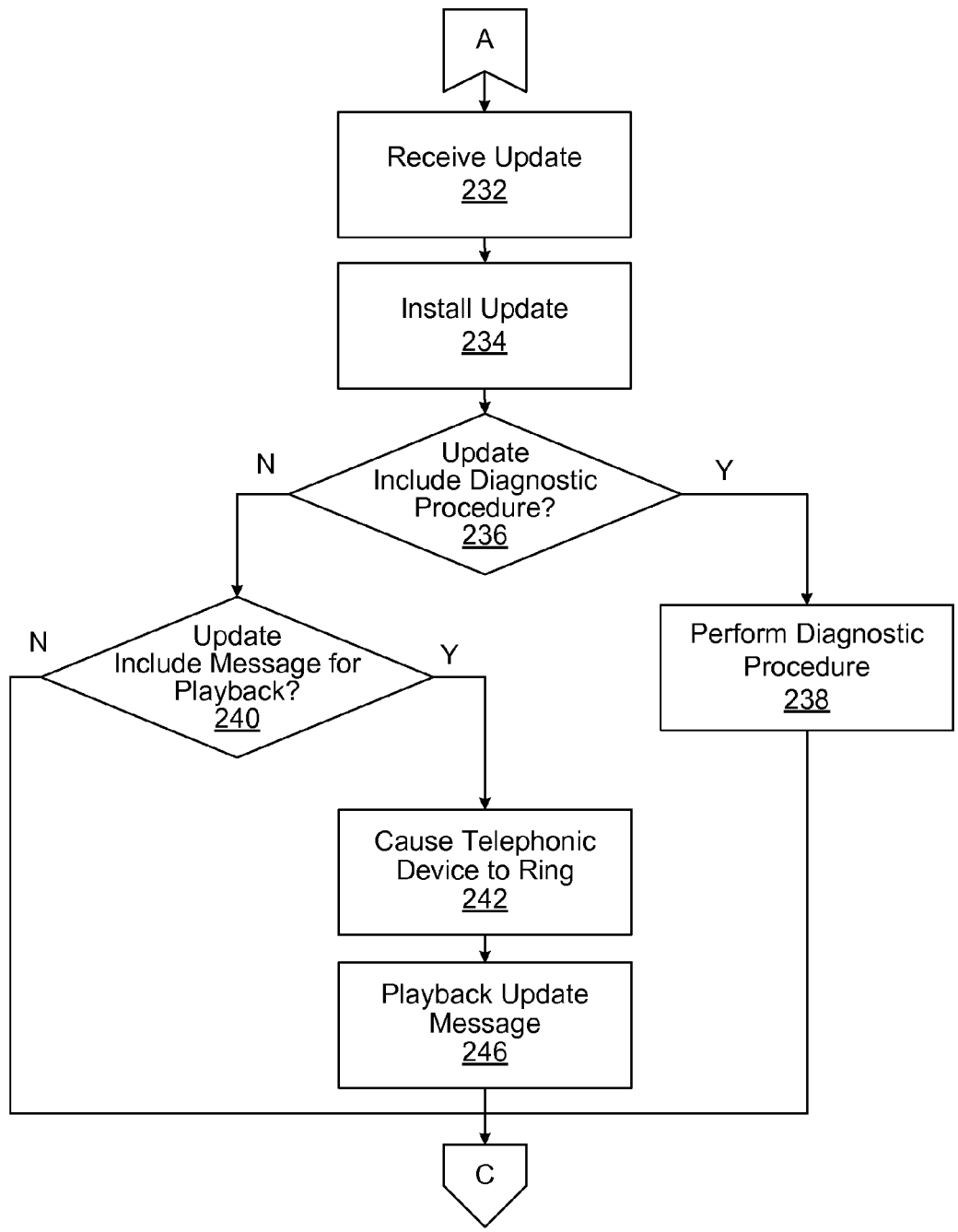
FIG. 2C further illustrates the flow diagram for the process of notification and troubleshooting performed by the system of FIG. 1 according to an example embodiment.

Before turning to the process flow diagrams of FIGS. 2A-2C, it is noted that the embodiments described herein may be practiced using an alternative order of the steps illustrated in FIGS. 2A-2C. That is, the process flows illustrated in FIGS. 2A-2C are provided as examples only, and the embodiments may be practiced using process flows that differ from those illustrated. Additionally, it is noted that not all steps are required in every embodiment. In other words, one or more of the steps may be omitted or replaced, without departing from the spirit and scope of the embodiments. Further, steps may be performed in different orders, in parallel with one another, or omitted entirely, and/or certain additional steps may be performed without departing from the scope and spirit of the embodiments. Finally, although the process 200 of FIGS. 2A-2C is described in connection with the CPE device 100 of FIG. 1, the process 200 may be performed by other devices.

FIG. 2A illustrates a flow diagram for a process 200 of notification and troubleshooting of interruptions, failures, and updates performed by the system 10 of FIG. 1 according to an example embodiment. At reference numeral 202, the process 200 includes determining a status of connectivity with a service provider. With reference to the elements of FIG. 1 as an example for context, at reference numeral 202, the CPE device 100 may determine one or more aspects of its status at reference numeral 202. For example, the CPE device 100 may determine whether it is being powered on for the first time, detect whether a telephonic device is coupled to the voice port 140, perform a hardware failure or error diagnostic check, perform a diagnostic of the status of connectivity with the service provider 170 or other network entities coupled to the network 160, or determine whether updates, such as software updates, are available for download and installation. In this sense, the determination of the status of the CPE device 100 at reference numeral 202 encompasses a broad determination device status consistent with the spirit and scope of the embodiments described herein.

At reference numeral 204, the process 200 includes determining whether an update is available, based on the status of the device determined at reference numeral 202. For example, a software update may be available for the CPE device 100. If it is determined that an update is available at reference numeral 204, then the process 200 proceeds to reference numeral 232, as illustrated and described in connection with FIG. 2C. On the other hand, if it is determined that an update is not available at reference numeral 204, then the process 200 proceeds to reference numeral 206, which includes determining whether the status identified at reference numeral 202 indicates an error condition. The error condition may indicate one of various hardware errors, failures, or error conditions, such as a failed power supply, a failed memory device, a failed processing circuit, or an error in connectivity with a service provider, for example, without limitation.

If no error condition is identified at reference numeral 206, the process 200 proceeds back to reference numeral 202. On the other hand, if an error condition is identified at reference numeral 206, the process 200 proceeds to reference numeral 208, which includes identifying a type of the error or failure. In this context, the control processing circuit 110 of the CPE device 100 may be configured to distinguish among various types of errors based on the status determined at reference numeral 202. The control processing circuit 110 may rely upon an error lookup table, for example, to correlate aspects of the status determined at reference numeral 202 with one or more identified errors or failures.

Continuing to reference numeral 210, the process 200 includes selecting a message for audible playback based on the type of the error or failure identified at reference numeral 208. Here, the control processing circuit 110 of the CPE device 100 may select one or more messages among various messages stored in the message memory area 124, each of which is available for audible playback, based on the type of error or failure identified at reference numeral 208.

At reference numeral 212, the process 200 includes causing a telephonic device to ring. For example, as described herein, the CPE device 100 may cause the telephonic device 150 coupled to the voice port 140 of the CPE device 100 to ring. In certain aspects and embodiments, causing the telephonic device to ring at reference numeral 212 may further include waiting or monitoring for an off-hook status of the telephonic device for a predetermined period of time. In other words, the CPE device 100 may cause the telephonic device 150 to ring, and wait a predetermined period of time for a user of the CPE device 100 pick up a handset of the telephonic device 150 (i.e., answer the call). If, for example, a user does not pick up the handset of the telephonic device 150 within the predetermined period of time, the CPE device 100 may schedule a secondary call at a different time, for example, or store a message for a user in a voicemail inbox. Additionally or alternatively, the CPE device 100 may overlay a message upon a display signal provided to the display 152, indicating that a voice message is awaiting playback for the user.

After detecting the off-hook status of the telephonic device at reference numeral 212, the process 200 further includes determining whether the message selected at reference numeral 210 includes a segmented message at reference numeral 214. In this context, the message selected at reference numeral 210 may include an installation troubleshooting message or a connectivity troubleshooting message, either of which may include a plurality of message segments. As further described below, a message embodied as a plurality of message segments may be relied upon by the CPE device 100 to provide a series of steps to a user of the CPE device 100, for troubleshooting various error conditions. Between message segments, the CPE device 100 may wait for the receipt of a response (e.g., a touchtone response), and direct further operations based on the response.

If a segmented message is not detected or determined at reference numeral 214, then the process 200 proceeds to reference numeral 216, which includes playing the message selected at reference numeral 210 to a user over the telephonic device. With reference to the elements of FIG. 1 as an example, the CPE device 100 may playback one or more messages stored in the message memory area 124 over the telephonic device 150, to advise a user of the CPE device 100 of one or more aspects of the status determined at reference numeral 202.

On the other hand, if a segmented message is detected or determined at reference numeral 214, then the process 200 proceeds to reference numeral 218, as illustrated in FIG. 2B. At reference numeral 218, the process 200 includes playing a first (or $i^{th}$) segment of the message over the telephonic device. At reference numeral 220, the process 200 includes waiting for a response from a user. For example, the CPE device 100 may wait for a predetermined period of time (e.g., 5, 10, 20, 30 seconds) after playing the first segment, to determine whether a response is provided by a user. If no response is received within the predetermined period of time, the CPE device 100 may conduct a subsequent or follow-up call at a later time.

It should be appreciated that, depending upon the first segment of the message, a user may be provided various options for reply. For example, the first segment of the message may identify a certain error condition, and provide a user with a first option to diagnose the condition or a second option to place a call to a service representative. One or more responses may be provided by a user using a touchtone keypad, for example. Additionally, one or more segments of the message may request the user to confirm certain conditions, such as whether a picture is visible on the display screen 152, or whether a physical connection of a cable is securely provided at the communications front end port 144. In this sense, the CPE device 100 may step a user through a flow or series of steps to confirm operating parameters of the CPE device 100.

At reference numeral 220, the process 200 further includes receiving a response from a user. In turn, at reference numeral 224, the process 200 includes performing a diagnostic procedure based on the response from the user received at reference numeral 220. For example, if the response from the user requests the CPE device 100 to analyze one or more operating parameters of the CPE device 100, the control processing circuit 110 may perform the analysis. Here, it is noted that, at reference numeral 224, the CPE device 100 may perform any action consistent with a response or request received from the user at reference numeral 220. Thus, the embodiments described herein are not limited to the performance of diagnostic procedures in response to commands from a user. Instead, various actions may be performed by the CPE device 100 in response to commands or requests from a user, consistent with the identification, troubleshooting, installation, or other functional or operating aspects of the CPE device 100.

Proceeding to reference numeral 226, the process 200 includes determining whether an error condition remains. In other words, the CPE device 100 may determine at reference numeral 226 whether further communications with and/or feedback from a user is required to address an outstanding or remaining error condition. If so, then the process 200 proceeds to reference numeral 228, which includes selecting a second segment of the message for audible playback. The selection of the second segment of the message may be based on an outcome of the diagnostic procedure conducted at reference numeral 224, for example. Here, it is noted that the selection of the second segment for playback may be based upon various factors. That is, any message may include certain segments which may be selected based upon a decision tree or other logic, and the decision tree or logic may be followed depending upon one or more current or previous status conditions.

If it is determined at reference numeral 226 that no error condition remains, then the process 200 proceeds to reference numeral 230, which includes concluding the message over the telephonic device. In this case, for example, if all operating status errors of the CPE device 100 have been addressed, then the message may conclude with a statement that the CPE device 100 is now functioning properly. After the conclusion at reference numeral 230, the process 200 proceeds back to reference numeral 202 in FIG. 2A, to further monitor the status of the device.

Turning to FIG. 2C, if it is identified at reference numeral 204 of FIG. 2A that an update is available, then the process 200 includes receiving or downloading the update at reference numeral 232. For example, at reference numeral 202 in FIG. 2A, the CPE device 100 may determine that a software update is available for download and installation. The update may include an update to one or more features of the CPE device 100. Alternatively or additionally, the update may include one or more updates to software to address or accommodate hardware or software errors, inconsistencies, or vulnerabilities. Further, the update may include one or more messages for playback, without any updates to software. If it is determined at reference numeral 202 that an update is available, then the CPE device 100 will receive or download the update at reference numeral 232 in FIG. 2C. Further, at reference numeral 234, the process 200 includes installing the update.

Continuing to reference numeral 236, the process 200 includes determining whether the update installed at reference numeral 234 includes a new diagnostic procedure. If so, the process 200 proceeds to reference 238, which includes performing the new diagnostic procedure based on the update installed at reference numeral 234. In turn, the process 200 proceeds back to reference numeral 202 in FIG. 2A. It is noted here that, based on any feature or software update installed at reference numeral 234 and the new diagnostic procedure performed at reference numeral 238, the status of the device may be re-determined at reference numeral 202.

If, at reference numeral 236, it is determined that no new diagnostic procedure was installed at reference numeral 234, then the process 200 proceeds to reference numeral 240, where it is determined whether the update includes a message for playback. If so, the process 200 proceeds to reference numeral 242, which includes causing the telephonic device to ring. Further, at reference numeral 246, the process 200 includes playing a feature update message over the telephonic device. It is noted that certain embodiments include causing the telephonic device to ring at reference numeral 242 regardless of whether a diagnostic procedure was performed or whether a new feature or other update was installed. For example, a new message may be downloaded, stored, and played back, regardless of whether a diagnostic procedure was performed or whether a new feature or other update was installed.

At reference numeral 246, for example, the CPE device 100 may cause the telephonic device 150 to ring and play a feature update, software update, or other (e.g., advertisement) message for a user over the telephonic device 150. The feature update message may indicate to the user that the CPE device 100 has been updated to include further features or enhancements. In other aspects, the feature update message may include promotions or advertisements for goods or services, for example. After reference numeral 246, the process 200 proceeds back to reference numeral 202 in FIG. 2A. If, at reference numeral 240, it is determined that the update installed at reference numeral 234 does not include a message for playback, the process 200 proceeds back to reference numeral 202 in FIG. 2A.

In the context of the description provided above, the embodiments described herein may be relied upon for early or advanced notification and troubleshooting of interruptions, failures, and updates of equipment and devices. Particularly, messages may be provided to a user of a device over a telephone, for example, coupled to the device, without the need to establish a call to a service technician. In other embodiments, messages may be provided to a user according to one or more messages displayed on a display device, or by one or more audio messages played over speakers of the display device. The messages may be stored locally on the equipment or device, updated over time, and may be relied upon to specify certain hardware or connectivity failures or errors to a user. Additionally, the hardware or connectivity failures or errors may be addressed by a user based on directions provided by a decision tree of message segments which instruct the user to confirm operating aspects of the device.

Figure 3:
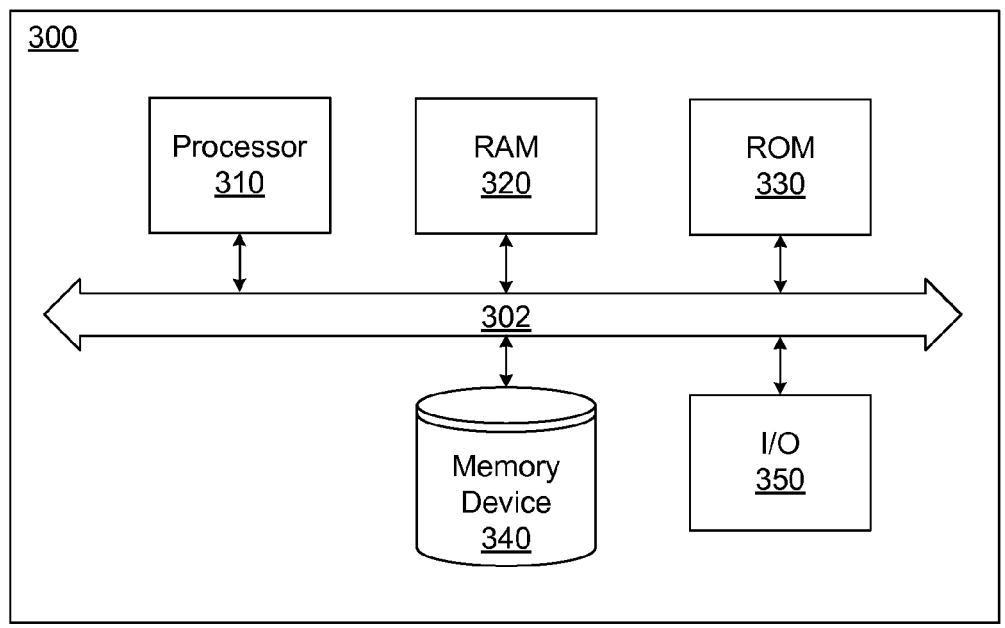
FIG. 3 illustrates an example schematic block diagram of a computing environment which may be employed in the system of FIG. 1 according to various embodiments.

FIG. 3 illustrates an example schematic block diagram of a computing architecture 300 that may be employed by one or more elements of the system 10 of FIG. 1, according to various embodiments described herein. The computing architecture 300 may be embodied, in part, using one or more elements of a mixed general and/or special purpose computer. The computing device 300 includes a processor 310, a Random Access Memory (RAM) 320, a Read Only Memory (ROM) 330, a memory device 340, and an Input Output (I/O) interface 350. The elements of computing architecture 300 are communicatively coupled via a bus 302. The elements of the computing architecture 300 are not intended to be limiting in nature, as the architecture may omit elements or include additional or alternative elements.

In various embodiments, the processor 310 may include any general purpose arithmetic processor, state machine, or ASIC, for example. In various embodiments, the control processing circuit 110 of the CPE device 100 of FIG. 1 may be implemented, at least in part, using a computing architecture including the processor 310. The processor 310 may include one or more circuits, one or more microprocessors, ASICs, dedicated hardware, or any combination thereof. In certain aspects and embodiments, the processor 310 is configured to execute one or more software modules. The processor 310 may further include memory configured to store instructions and/or code to perform various functions, as further described herein. In certain embodiments, the process 200 described in connection with FIGS. 2A-2C may be implemented or executed by the processor 310.

The RAM and ROM 320 and 330 include any random access and read only memory devices that store computer-readable instructions to be executed by the processor 310. The memory device 340 stores computer-readable instructions thereon that, when executed by the processor 310, direct the processor 310 to execute various aspects of the embodiments described herein.

As a non-limiting example group, the memory device 340 includes one or more non-transitory memory devices, such as an optical disc, a magnetic disc, a semiconductor memory (i.e., a semiconductor, floating gate, or similar flash based memory), a magnetic tape memory, a removable memory, combinations thereof, or any other known non-transitory memory device or means for storing computer-readable instructions. The I/O interface 350 includes device input and output interfaces, such as keyboard, pointing device, display, communication, and/or other interfaces. The bus 302 electrically and communicatively couples the processor 310, the RAM 320, the ROM 330, the memory device 340, and the I/O interface 350, so that data and instructions may be communicated among them.

In certain aspects, the processor 310 is configured to retrieve computer-readable instructions and data stored on the memory device 340, the RAM 320, the ROM 330, and/or other storage means, and copy the computer-readable instructions to the RAM 320 or the ROM 330 for execution, for example. The processor 310 is further configured to execute the computer-readable instructions to implement various aspects and features of the embodiments described herein. For example, the processor 310 may be adapted or configured to execute the process 200 described above in connection with FIGS. 2A-2C. In embodiments where the processor 310 includes a state machine or ASIC, the processor 310 may include internal memory and registers for maintenance of data being processed.

The flowchart or process diagram of FIGS. 2A-2C are representative of certain processes, functionality, and operations of embodiments described herein. Each block may represent one or a combination of steps or executions in a process. Alternatively or additionally, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as the processor 310. The machine code may be converted from the source code, etc. Further, each block may represent, or be connected with, a circuit or a number of interconnected circuits to implement a certain logical function or process step.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

What is claimed is:

1. A method comprising:
    receiving status data indicating an error in connectivity between a device and a service provider;
    processing the status data to determine a type of the error from among a plurality of types of errors;
    selecting a first message to transmit to the device from among a plurality of stored messages using the type of the error, the first message prompting the user to provide information relating to the error;
    transmitting the first message to the device;
    receiving response data from the user in response to the first message, the response data providing the information relating to the error;
    processing the response data to determine a diagnostic procedure to perform in response to the first message; and
    performing the diagnostic procedure determined using the response data.

2. The method of claim 1, wherein the device comprises a telephonic device, and wherein transmitting the first message to the device comprises causing the first message to be played through a microphone of the telephonic device.

3. The method of claim 2, further comprising causing the telephonic device to ring before causing the first message to be played through the microphone.

4. The method of claim 3, further comprising:
    while causing the telephonic device to ring, monitoring for an off-hook status of the telephonic device; and
    after detecting the off-hook status, playing the first message over the telephonic device.

5. The method of claim 3, further comprising:
    detecting whether the telephonic device is coupled to a voice port of the device; and
    when the telephonic device is not coupled to the voice port of the device, providing a voice message indicator on a display output of the device.

6. The method of claim 1, further comprising:
    after the diagnostic procedure, selecting a second message from among the plurality of stored messages based on an outcome of the diagnostic procedure; and
    transmitting the second message to the device.

7. The method of claim 1, wherein:
    determining the status of connectivity comprises performing a diagnostic analysis on a communications channel between the device and the service provider; and
    selecting the first message comprises selecting the first message using the diagnostic analysis.

8. The method of claim 7, wherein the diagnostic analysis includes a spectrum analysis identifying a power density of communications channels across a frequency band over time.

9. The method of claim 1, further comprising:
    receiving an update from the service provider, the update including an update to at least one feature of the device; and
    in response to the update, transmitting a message to the device indicating the update is available.

10. A system comprising:
    circuitry configured to:
    receive status data indicating an error in connectivity between a device and a service provider;
    process the status data to determine a type of the error from among a plurality of types of errors;
    select a first message to transmit to the device from among a plurality of stored messages using the type of the error, the first message prompting the user to provide information relating to the error;
    transmit the first message to the device;
    receive response data from the user in response to the first message, the response data providing the information relating to the error;
    process the response data to determine a diagnostic procedure to perform in response to the first message; and
    perform the diagnostic procedure determined using the response data.

11. The system of claim 10, wherein the device further comprises a telephonic device, and wherein the circuitry is configured to cause the telephonic device to ring and the first message to be played through a microphone of the telephonic device.

12. The system of claim 11, wherein the circuitry is further configured to:
    while causing the telephonic device to ring, monitor for an off-hook status of the telephonic device; and
    after detecting the off-hook status, play the first message over the telephonic device.

13. The system of claim 11, wherein the circuitry is further configured to:
    detect whether the telephonic device is coupled to a voice port of the device; and
    when the telephonic device is not coupled to the voice port of the device, provide a voice message indicator on a display output of the device.

14. The system of claim 10, wherein the circuitry is further configured to:
    after the diagnostic procedure, select a second message from among the plurality of stored messages based on an outcome of the diagnostic procedure; and
    transmit the second message to the device.

15. The system of claim 10, wherein the circuitry is further configured to:
- determine the status of connectivity by performing a diagnostic analysis on a communications channel between the device and the service provider; and
- select the first message using the diagnostic analysis.

16. One or more computer-readable storage media having instructions stored thereon that, when executed by one or more processors, cause the one or more processors to implement operations comprising:
- receiving status data indicating an error in connectivity between a device and a service provider;
- processing the status data to determine a type of the error from among a plurality of types of errors;
- selecting a first message to transmit to the device from among a plurality of stored messages using the type of the error, the first message prompting the user to provide information relating to the error;
- transmitting the first message to the device;
- receiving response data from the user in response to the first message, the response data providing the information relating to the error;
- processing the response data to determine a diagnostic procedure to perform in response to the first message;
- performing the diagnostic procedure determined using the response data;
- selecting a second message from among the plurality of stored messages based on an outcome of the diagnostic procedure; and
- transmitting the second message to the device.

17. The one or more computer-readable storage media of claim 16, wherein the device further comprises a telephonic device, and wherein the operations further comprise causing the telephonic device to ring and the first message to be played through a microphone of the telephonic device.

18. The one or more computer-readable storage media of claim 17, wherein the operations further comprise:
- while causing the telephonic device to ring, monitoring for an off-hook status of the telephonic device; and
- after detecting the off-hook status, playing the first message over the telephonic device.

19. The one or more computer-readable storage media of claim 17, wherein the operations further comprise:
- detecting whether the telephonic device is coupled to a voice port of the device; and
- when the telephonic device is not coupled to the voice port of the device, providing a voice message indicator on a display output of the device.

20. The one or more computer-readable storage media of claim 16, wherein:
- determining the status of connectivity comprises performing a diagnostic analysis on a communications channel between the device and the service provider; and
- selecting the first message comprises selecting the first message using the diagnostic analysis.

* * * * *